(12) United States Patent  
Perincherry

(10) Patent No.: US 9,344,519 B2  
(45) Date of Patent: May 17, 2016

(54) RECEIVING AND CORRELATION OF USER CHOICES TO FACILITATE RECOMMENDATIONS FOR PEER-TO-PEER CONNECTIONS

(71) Applicant: Discourse Analytics, Inc., Bethesda, MD (US)

(72) Inventor: Vijay Perincherry, Potomac, MD (US)

(73) Assignee: DISCOURSE ANALYTICS, INC., Bethesda, MD (US)

( * ) Notice: Subject to any disclaimer, the term of this patent is extended or adjusted under 35 U.S.C. 154(b) by 389 days.

(21) Appl. No.: 13/918,063

(22) Filed: Jun. 14, 2013

(65) Prior Publication Data

US 2013/0339445 A1    Dec. 19, 2013

Related U.S. Application Data

(60) Provisional application No. 61/659,593, filed on Jun. 14, 2012.

(51) Int. Cl.
| | |
|---|---|
| *G06F 15/16* | (2006.01) |
| *H04L 29/08* | (2006.01) |
| *G06Q 30/02* | (2012.01) |
| *G06F 17/30* | (2006.01) |
| *G06Q 30/06* | (2012.01) |
| *H04N 21/25* | (2011.01) |
| *G06Q 10/10* | (2012.01) |
| *G06Q 50/00* | (2012.01) |

(52) U.S. Cl.
CPC ........ *H04L 67/306* (2013.01); *G06F 17/30699* (2013.01); *G06F 17/30867* (2013.01); *G06Q 10/10* (2013.01); *G06Q 30/02* (2013.01); *G06Q 30/0203* (2013.01); *G06Q 30/0237* (2013.01); *G06Q 30/0239* (2013.01); *G06Q 30/0269* (2013.01); *G06Q 30/06* (2013.01); *G06Q 30/0631* (2013.01); *G06Q 50/01* (2013.01); *H04L 67/02* (2013.01); *H04L 67/22* (2013.01); *H04N 21/252* (2013.01)

(58) Field of Classification Search
CPC .................... G06F 17/30699; G06F 17/30867; G06Q 30/02; G06Q 30/0203; G06Q 30/0237; G06Q 30/0239; G06Q 30/0269; G06Q 30/06; H04N 21/252
USPC ....................................................... 709/204
See application file for complete search history.

(56) References Cited

U.S. PATENT DOCUMENTS

| | | | | |
|---|---|---|---|---|
| 6,112,186 A * | 8/2000 | Bergh | ............... | G06F 17/30699 705/14.37 |
| 8,775,242 B2 * | 7/2014 | Tavares | ............... | G06Q 30/00 705/14.1 |
| 2007/0099162 A1 * | 5/2007 | Sekhar | ............... | G06Q 30/02 434/323 |
| 2009/0287763 A1 * | 11/2009 | Svendsen | ............... | G06Q 30/02 709/203 |
| 2011/0289431 A1 * | 11/2011 | Olumoko | ............... | G06Q 30/0203 715/753 |
| 2013/0046517 A1 * | 2/2013 | Baym | ............... | G06F 17/5009 703/2 |

*Primary Examiner* — Richard G Keehn
(74) *Attorney, Agent, or Firm* — Terry M. Sanks, Esq.; Beusse Wolter Sanks & Maire, PLLC

(57) ABSTRACT

Systems, methods, and computer program products are disclosed which facilitate collecting information about users, including responses to poll prompts, and analyzing such information in order to determine correlations and inter-relationships of information and information areas. In an aspect, information from many users is collected across a variety of user interaction channels and computing device platforms. Such information is analyzed in order to generate profiles of like-minded individuals. Such profiles may be useful for recommending peer-to-peer connection between individuals, marketing products and services to individuals with similar attributes and traits, and examining changes in individual preferences over time or in response to external factors.

26 Claims, 8 Drawing Sheets

RECEIVING AND CORRELATION OF USER CHOICES TO FACILITATE RECOMMENDATIONS FOR PEER-TO-PEER CONNECTIONS

CROSS-REFERENCE TO RELATED APPLICATIONS

This application claims the benefit of U.S. Provisional Patent Application No. 61/659,593, filed Jun. 14, 2012, and entitled "Receiving and Correlation of User Choices to Facilitate Recommendations for Peer-to-Peer Connections," the entire contents of which is incorporated herein by reference.

FIELD OF THE DISCLOSURE

The present disclosure relates to individual and group behavior analysis, and more particularly to systems, methods and computer program products for correlating information about individuals across larger groups.

BACKGROUND

Historically, public opinion polls have been used in the United States to assess the opinions of the population on a given issue, individual, or group. Such polls have also been widely used to determine public or group sentiment regarding companies, products, potential future products, and the like. A properly-formulated poll provides a snapshot of the content, intensity, and consistency of opinion for a target group. Polls have been used to capture the opinions of large groups, such as likely United States voters, medium-sized groups such as "U.S. Republican voters," and small groups such as "Democratic voters living in Austin, Tex." Public opinion polling can identify individual and group desires, motivations, and opinions on issues such as specific topics, individuals, political parties, and philosophical leanings.

The results of an individual poll comprise survey responses from individuals who participated in the poll and statistical analyses of the survey responses of some or all of the participating individuals. These statistical analyses are commonly known as a poll's "results." Once collected, polling information is widely used by news organizations, political campaigns, and businesses for a variety of purposes including product planning, targeted advertising and, in the case of political polls, shaping the tenor of a candidate's political platform in order to better connect with potential voters. Poll results, in particular political poll results, may also reported to the public at large.

Many methods of conducting public opinion polls are time-intensive, costly, and inefficient because the location of suitable poll respondents willing to participate and complete the poll can be problematic. For example, telephone polling has traditionally been used to perform political polling. Telephone polling has a very large nonresponse bias because polling calls are missed, many individuals do not answer calls from unknown telephone numbers and, of the individuals that do answer the initial call, many refuse to complete the survey. Failed attempts vastly outnumber successful interviews of individuals for a given poll. In order to gather 1,200 complete responses, it is not uncommon for 40,000 phone calls to be placed—a 3% return rate.

Polling is one approach to gathering information about individual and group behavior. Other approaches include observation of group and individual purchasing habits, Internet browsing habits, and the like. Information about individual and group behavior is routinely collected by a variety of sources.

Given the foregoing, what is needed are systems, methods, and computer program products which collect information from individuals and groups, and analyze the collected data in order to generate actionable results. Additionally, systems, methods, and computer program products are needed which collect information and construct profiles indicating preferences of an individual or group, based on the information collected.

Systems, methods, and computer program products are also needed which aggregate information collected about individuals and groups and analyzes such information in order to generate profiles indicating interest in a variety of topics, products, and services. In particular, analysis of such information, which is updated as new information is collected, is needed. Additionally, facilitating analysis of what factors indicate an individual or group will behave in a certain way (e.g., vote Republican, buy a new computer) is needed.

SUMMARY

This Summary is provided to introduce a selection of concepts in a simplified form that are further described below in the Detailed Description. This Summary is not intended to identify key features or essential features of the subject matter, nor is it intended to be used to limit the scope of the subject matter.

This disclosure addresses the above-described needs by providing methods, computer program products, and systems for facilitating peer-to-peer connections based on collections of consumer choices and behaviors. The present disclosure gathers polling data more effectively than previous methods by packaging data collection tools within a social networking environment. The user's motivation to provide data is high because the user receives a potentially long-lasting benefit: acquaintance with other individuals who share similar values and levels of passion about selected topics.

In an aspect, a user's opinions are received regarding specific topics. User opinion may be received via user responses to one or more polls presented to the user. A poll is comprised of a prompt and a two or more answer choices. For example, a poll may comprise a prompt with the following query, "Should the government support stem cell research?", with the accompanying answer choices "Yes" and "No." The user may then select an answer choice which reflects their opinion on the presented prompt.

Received opinions are analyzed and integrated into a multi-dimensional user profile. The multi-dimensional user profile comprises information specific to the user including received opinions, information about the user received from third parties (e.g., information about the user from their FACEBOOK® account (available from Facebook, Inc. of Menlo Park, Calif.)), and information received directly from the user, such as demographic information and political party affiliation. In some aspects, the multi-dimensional user profile comprises information about the user's interest levels in broader topics such as economics, federal government budget issues, crime, and immigration. In another aspect, the user is presented with a plurality of polls which are selected to facilitate identification of user choices and behaviors including, but not limited to, prompt-specific political beliefs (e.g., if the government should support stem cell research), the user's political leanings on a specific issue (e.g., government involvement in healthcare), and the user's overall political leaning (e.g., liberal, conservative, progressive, etc.). User choices, opinions, and behaviors are included in the user's multi-dimensional user profile which may be stored in a computer readable medium.

In some aspects, multi-dimensional user profiles are created comprising previously-received user responses to polls and user information, including user demographic information. Polls, customized to individuals, are presented to the user community and poll results are collected, indicating the frequency distribution of the user community's opinion of the topic prompt presented. Profile information of the user community from individual user's multi-dimensional profiles is analyzed and frequency distributions of user attributes are created. In an aspect, user attributes are divided into static attributes that include, but are not limited to, political party, responses to previous polls, location, annual income, education, and other user demographic information, as well as dynamic attributes that include, but limited to, issue interest levels, political leanings along issues, and revealed preferences. Frequency distributions of user attributes are compared to poll results. This comparison facilitates the location of influential user attributes for a give poll or topic.

Further features and advantages of the methods, computer program products, and systems disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to providing methods, computer program products, and systems for facilitating user connections based on collections of user profile information and for analyzing collections of user profile information and poll results.

Figure 1:
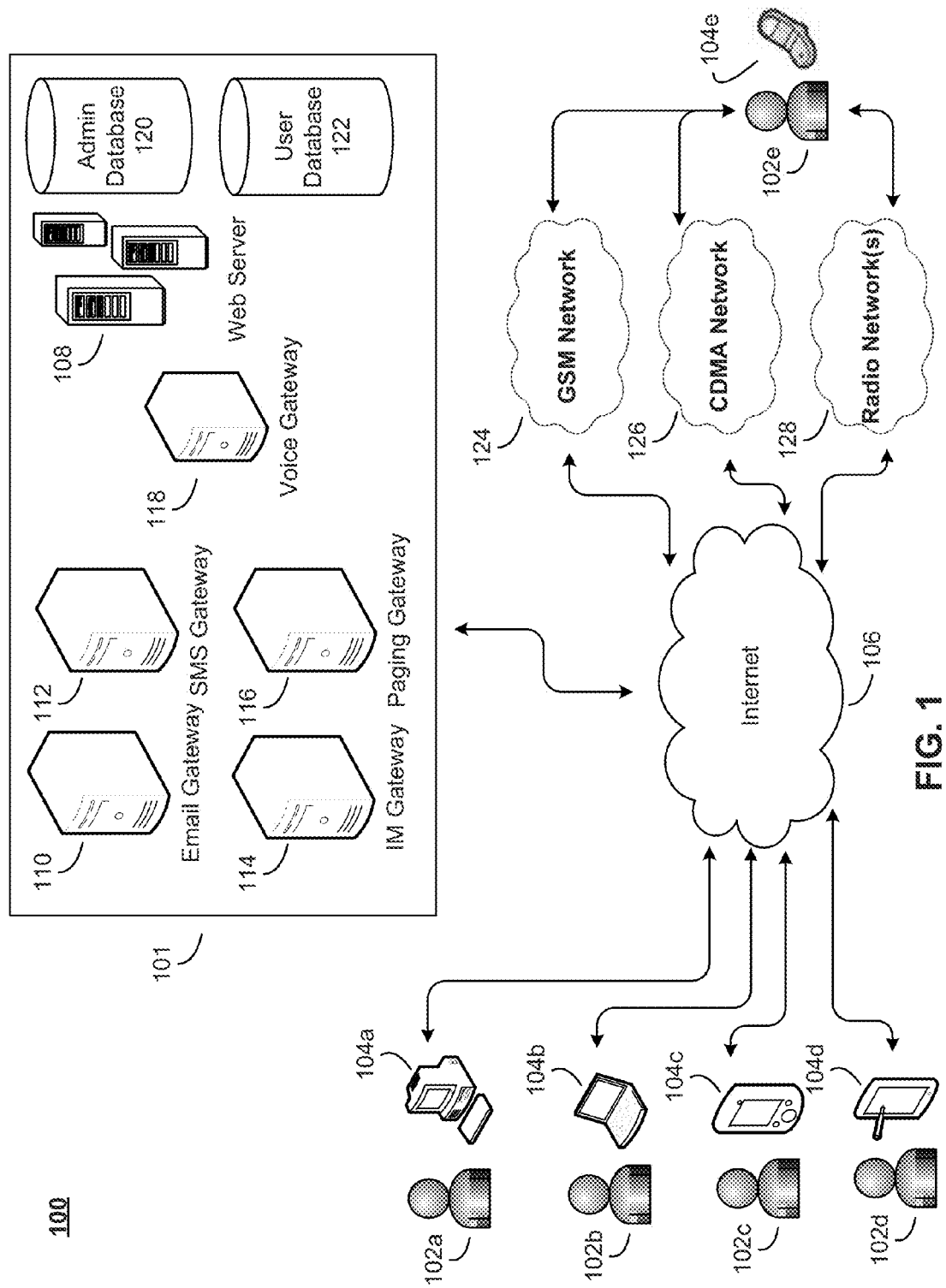
FIG. 1 is a block diagram illustrating an exemplary online polling portal environment for facilitating user connections based on collections of consumer choices and behaviors, according to the present disclosure.

Referring to FIG. 1, a block diagram illustrating an exemplary online polling portal environment 100 for facilitating user connections based on collections of consumer choices and behaviors, according to an aspect of the present disclosure, is shown. Environment 100 includes a plurality of users 102 (shown as users 102a-e in FIG. 1) accessing—via a computing device 104 (shown as respective computing devices 104a-e in FIG. 1) and a network 106, such as the global, public Internet—an application service provider's polling (hardware and software) infrastructure 101. In various aspects, computing device 104 may be configured as a desktop computer 104a, a laptop computer 104b, a personal digital assistant (PDA) 104c, a tablet or mobile computer 104d, a mobile telephone 104e, any commercially-available communications device or the like.

As shown in FIG. 1, in an aspect of the present disclosure, an application service provider's polling infrastructure 101 may include a web server 108, an email gateway 110, an SMS gateway 112, an instant message (IM) gateway 114, a paging gateway 116, a voice gateway 118, an administrative database 120 and a user database 122. In such an aspect, polling infrastructure 101 would be connected to one or more telecommunications networks such as a GSM network 124, a CDMA network 126, a radio network 128 or the like. Such networks 124-128 would allow polling infrastructure 101 to communicate with one or more users 102 via SMS, IM, voice, email and/or paging utilizing the appropriate one of gateways 110-118.

As will be appreciated by those skilled in the relevant art(s) after reading the description herein, in such an aspect, a service provider may allow access, on a free registration, paid subscriber and/or pay-per-use basis, to polling infrastructure 101 via one or more World-Wide Web (WWW) sites on Internet 106. Thus, system 100 is scaleable such that multiple users 102 may utilize it according to the various aspect of the present disclosure described herein.

As will also be appreciated by those skilled in the relevant art(s), in an aspect, various (login, admin, account, information, resource, logout, payment, registration, communications, etc.) screens would be generated by server 108 in response to input from users 102 over Internet 106. That is, in such an aspect, server 108 is a typical Web server running a server application at a Web site which sends out Web pages in response to Hypertext Transfer Protocol (HTTP) or Hypertext Transfer Protocol Secured (HTTPS) requests from remote browsers on various devices 104 being used by various users 102. Thus, server 108 is able to provide a graphical user interface (GUI) to users 102 of system 100 in the form of Web pages. These Web pages sent to the user's PC, laptop, mobile device, PDA or the like device 104, and would result in the GUI being displayed.

As will also be appreciated by those skilled in the relevant art(s) after reading the description herein, alternate aspects of the present disclosure may include providing the tool for facilitating user connections based on collections of consumer choices as a stand-alone system (e.g., installed on one PC) or as an enterprise system wherein all the components of polling infrastructure 101 are connected and communicate via an inter-corporate wide area network (WAN) or local area network (LAN), rather than as a Web service (i.e., application service provider (ASP) model) as shown in FIG. 1.

As will also be appreciated by those skilled in the relevant art(s) after reading the description herein all users 102 account information described herein may be stored in one or more databases 120, 122 that are accessible by server 108. In an alternate aspect, the various data used by polling infrastructure 101 can be stored in one or more memory included in (or coupled to) server 108.

Figure 2:
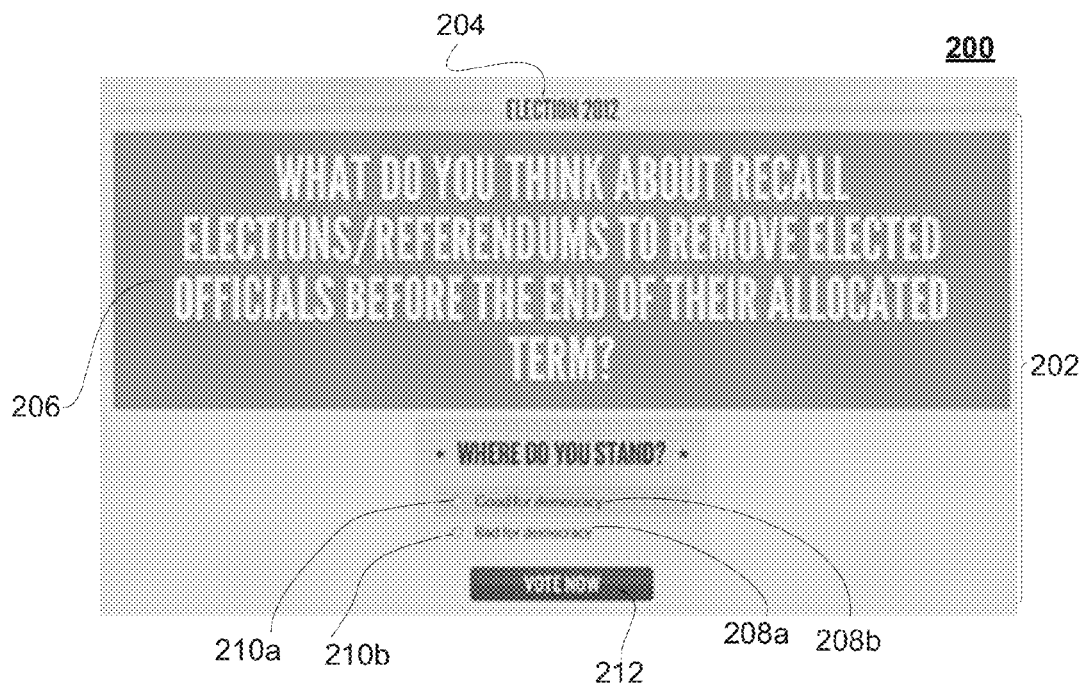
FIG. 2 is a screenshot of an exemplary graphical user interface for presenting a user with one or more prompts and receiving user opinions, according to the present disclosure.

Referring now to FIG. 2, a screenshot 200 of an exemplary graphical user interface (GUI) for presenting a user with one or more prompts and receiving user opinions according to an aspect of the present disclosure, is shown.

User 102 may be presented with a poll 202. Presentation of poll 202 occurs at, for example, computing device 104 with its presentation being facilitated by Internet 106. Poll 202 comprises a question and corresponding answer choices related to a topic 204. Topic 204 of poll 202 may be chosen from, but not limited to, the following categories: products, services, political beliefs, events, and religious beliefs. Examples of specific, politically-related topics 204 may include: economics, budget issues, an election, healthcare, foreign policy, taxes, crime, immigration, education, GLBT issues, and abortion. In an aspect, poll 202 comprises a prompt 206 and two or more answer choices 208 (shown as answer choices 208a-208b in FIG. 2).

Prompt 206 is a question or statement presented in text form. In another aspect, prompt 206 is an audiovisual presentation, such as a clip of a speaker asking a question or making a statement. In another aspect, prompt 206 is an audio clip. In yet another aspect, prompt 206 is a visual representation, such as a picture. In some aspects, prompt 206 is a question or statement about current events written by the application service provider personnel to elicit a response when presented to user 102. In other aspects, prompt 206 is a picture, audio file, or audiovisual clip of a political figure making statements on current events programmatically chosen or chosen by application service provider personnel to elicit a response when presented to user 102.

Poll 202 also comprises two or more answer choices 208, answer choice 208 may be a statement presented in text form. In other aspects, answer choice 208 is an audio, visual, or audiovisual representation of a person, product, service, criterion, location, or organization, etc. Answer choices 208 are chosen to reflect possible user opinions on prompt 206.

In an aspect, poll 202 comprises prompt 206 with the following query "Should the government support stem cell research?" and accompanying answer choices 208 "Yes" and "No." User 102 selects an answer choice 208, reflecting the user's opinion of prompt 206.

User 102 selects answer choice 208 via answer selector 210 (shown as answer selector 210a-210b in FIG. 2). In the aspect depicted in FIG. 2, answer selector 210 is a radio button configured to accept user 102 selection by being clicked on with a cursor (or tapped). In another aspect, answer selector 210 is a check box or user-selectable icon. In yet another aspect, answer selector 210 is a user-selectable icon comprising answer choice 208. In other aspects, any configuration of answer selector 210 apparent to those skilled in the relevant art(s) after reading the description herein may be utilized.

Answer selector 210 may be configured to allow user 102 to select a single answer choice 208 or answer selector 210 may be configured to allow user 102 to select multiple answer choices 208. Answer selectors 210 configured to allow selection of a single answer choice 208 is appropriate where poll 202 indicates that user 102 should choose the answer choice 208 which most closely represents their opinion. Answer selectors 210 configured to allow selection of multiple answer choices 208 are chosen where poll 202 indicates that user 102 should choose all answer choices 208 which apply to them.

In some aspects, user 102 confirms the answer choice(s) 208 selected with answer selector(s) 210 via answer submitter 212. Answer submitter 212 is a user-selectable icon configured to confirm the selection of answer choice(s) 208 before they are submitted. In the aspect depicted in FIG. 2, answer submitter 212 is a user-selectable icon with text that reads "VOTE NOW." After selecting an answer choice 208 via answer selector 210, user 102 submits their selection by clicking answer submitter 212. In other aspects, answer submitter 212 is a pop up frame asking if user 102 is sure about their answer choice 208 selection(s).

In an aspect, poll 202 is presented to user 102 within a social networking platform dedicated to political issues. In another aspect, poll 202 may be presented to user 102 as a webpage, within a banner advertisement on a webpage, within a widget on a webpage, within a general social networking platform such as the FACEBOOK® site (available from Facebook, Inc. of Menlo Park, Calif.) or any other location that will be apparent to those skilled in the relevant arts after reading the description herein.

Poll 202 may be presented to user 104 from a variety of computing devices 102, including a mobile device 104e. Mobile device 104e may present poll 202, or another screen generated by infrastructure 101 by utilizing an operating system which will be apparent to those skilled in the art after reading the description herein, such as the iOS® operating system (available from Apple, Inc. of Cupertino, Calif.) or the Android® operating system (available from Google, Inc. of Menlo Park, Calif.). In an aspect, a user 102 may interact with infrastructure 101 across multiple computing devices 104, such as a personal desktop computer 104a, an employer-supplied laptop computer 104b, and a personal mobile telephone 104e.

Figure 3:
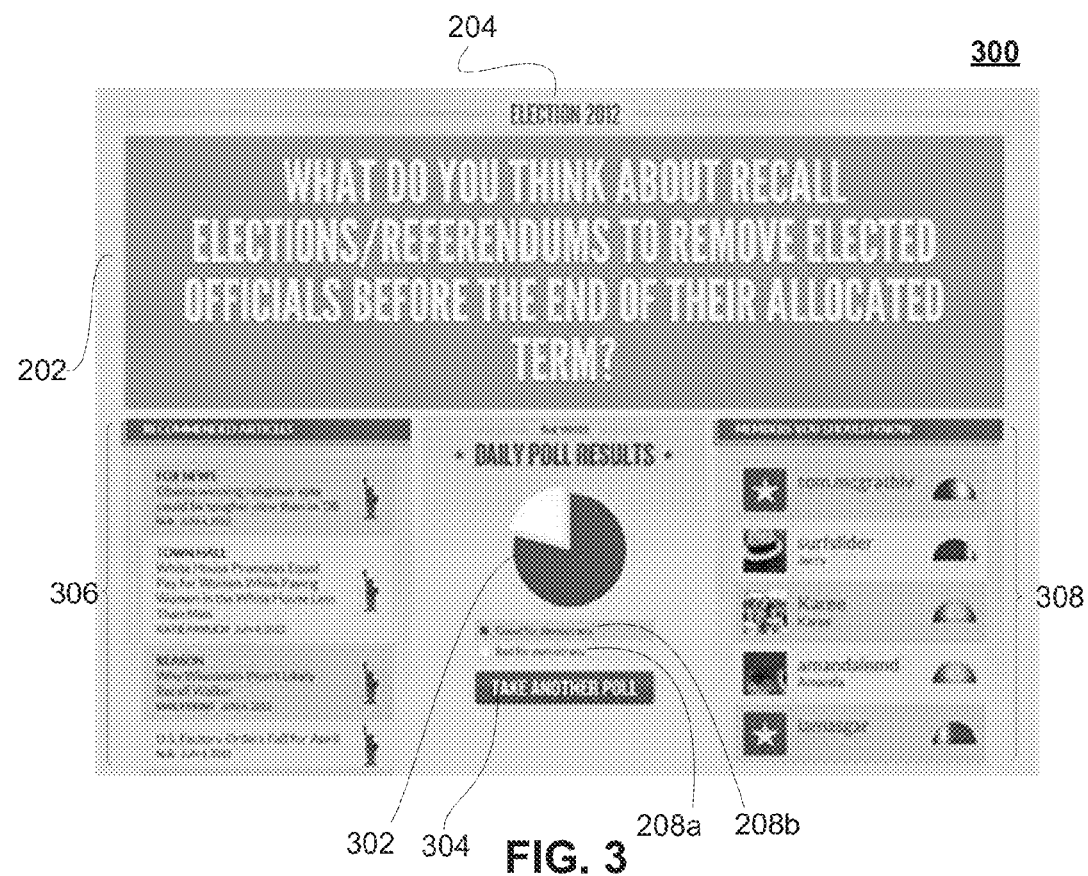
FIG. 3 is a screenshot of an exemplary graphical user interface for presenting a user with one or more prompts, one or more media recommendations, and one or more peer recommendations, according to the present disclosure.

Referring now to FIG. 3, a screenshot 300 of an exemplary GUI for presenting a user 102 with one or more prompts, one or more media recommendations, and one or more peer recommendations, according to an aspect of the present disclosure, is shown.

In the aspect depicted in FIG. 3, results 302 of poll 202 are presented to user 102. Results 302 is a graphical representation of user opinions received from at least a portion of users 102 which have participated in poll 202. Results 302 is a pie chart presented to a user 102 with the relative frequency users 102 have selected answer choice 208a and answer choice 208b. In another aspect, results 302 is a bar graph indicating the percentages of users 102 that have selected each answer choice 208. In some aspects, results 302 indicate the number of times each answer choice 208 has been selected. In other aspects, results 302 may display poll results as the proportion of times each answer was chosen, or in any manner that will be apparent to those that have ordinary skill in the relevant art(s) after reading the description herein.

In some aspects, user 102 is presented with an option 304 to participate in another poll. Option 304 may be a user-selectable icon configured to present user 102 with another poll 202 when option 304 is selected.

One or more media recommendations 306 are presented to user 102 in some aspects. Media recommendation 306 is a piece of information related to user interests or other information being presented to user 102, including poll 202 or poll topic 204. Pieces of information include, but are not limited to, article headlines, portions of news articles, portions of or the entirety of social media posts (e.g., a TWITTER® posting (available from Twitter, Inc. of San Francisco, Calif.), a FACEBOOK® status update (available from Facebook, Inc. of Menlo Park, Calif.)), images, contributions from other users 102 in the form of discussion entries, and audiovisual clips.

In some aspects, one or more media recommendations 306 are related to poll topic 204 or poll 202 presented to user 102. For example, screenshot 300 depicts a poll 202 about a poll topic 204 ("Election 2012"). Media recommendations 306 discussing presidential election issues are presented which are related to poll topic 204. In some aspects, media recommendations 306 are selectable Internet hyperlinks. In another aspect, media recommendations 306 are presented to user 102 based on their interest in topics indicated by information stored (e.g., in database 122) in a multi-dimensional profile associated with user 102. For example, media recommendations 306 related to the United States economy may be presented to user 102 if their multi-dimensional profile indicates a strong interest in economic issues.

In some aspects, a user 102 is presented with a member listing 308 of other users 102 who share similar characteristics with them. In one aspect, characteristic similarity is determined by comparing information contained in each user's multi-dimensional profile. Member listing 308 may be a linear list, a grid, a collage, or another arrangement or data structure of user information related to other users 102 who share similar characteristics with a given user 102. In some aspects, information about users 102 is received directly from responses to polls 202 and user-entered demographic information. Users 102 listed in member listing 308 share one or more characteristics with a given user 102, including congruency of opinion on a poll topic 204, the same or similar answer choice 208 selection for a given poll 202, similar demographic information, and similarity of interest level for one or more poll topics 204.

Figure 4:
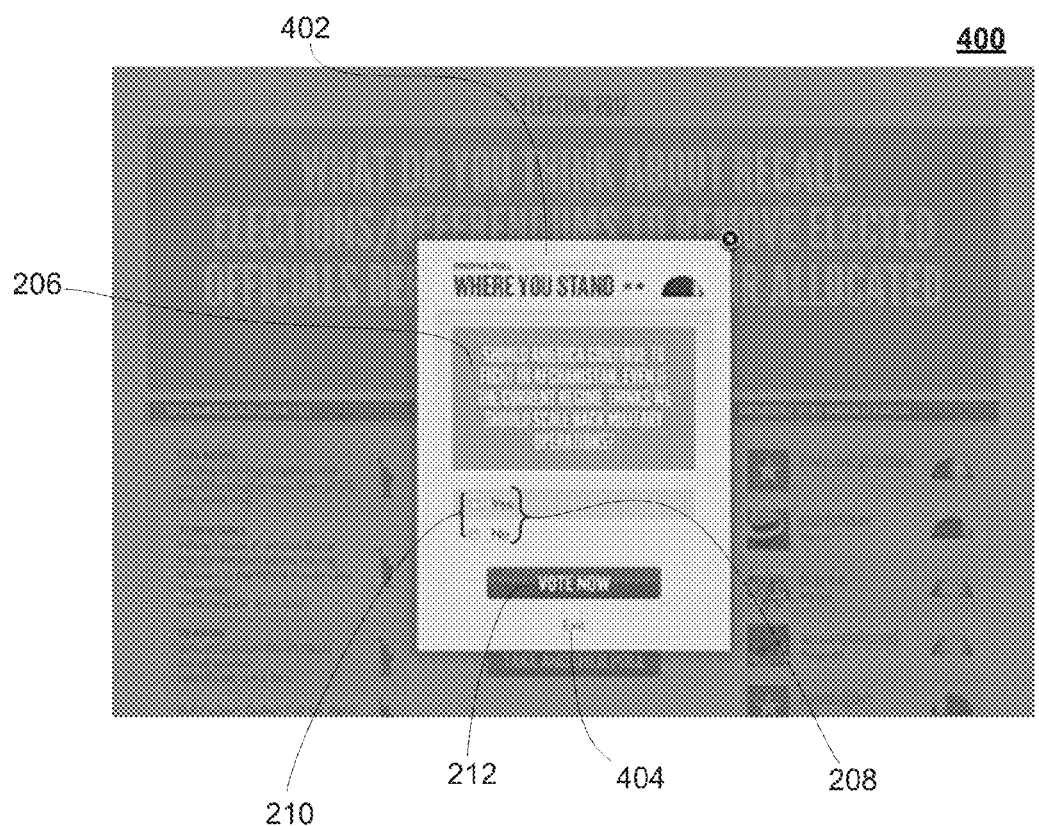
FIG. 4 is a screenshot of an exemplary graphical user interface for presenting one or more additional prompts and receiving user opinions, according to the present disclosure.
Figure 5:
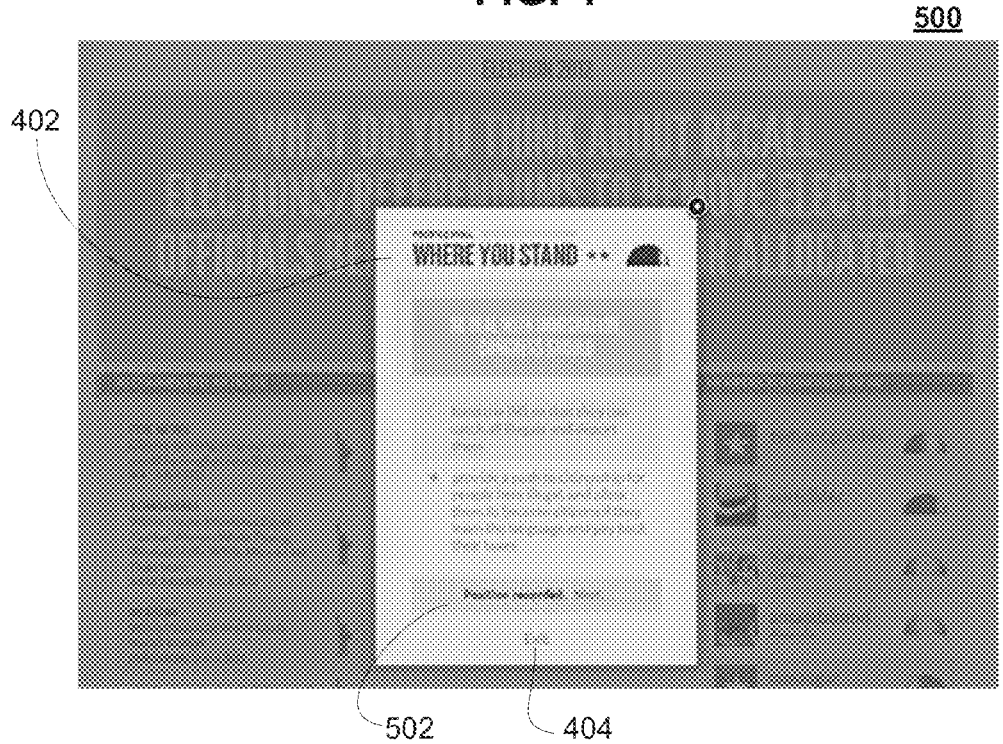
FIG. 5 is a screenshot of an exemplary graphical user interface for acknowledging receipt of user opinion, according to the present disclosure.

Referring now to FIGS. 4 and 5, screenshots 400 and 500 illustrate exemplary graphical user interfaces for receiving user opinions regarding multiple polls 202, according to an aspect of the present disclosure.

In the aspect depicted in FIG. 4, additional polls 202 are presented to user 102 via a pop-up frame 402. In some aspects, only pop-up frame 402 is user selectable. In order to access other portions of the present disclosure, an exit 404 button must be selected by user 102. User 102 selects an answer choice 208 via answer selector 210 and confirms selection of answer choice 208 via answer submitter 212. In some aspects (e.g., the aspect depicted in FIG. 5), user 102 confirms selection of answer choice 208 via answer submitter 212 and is presented with an answer confirmation 502 before another poll 202 is presented to the user. Answer confirmation 502 is a graphical representation indicating that user's answer choice 208 selection has been received.

Figure 6:
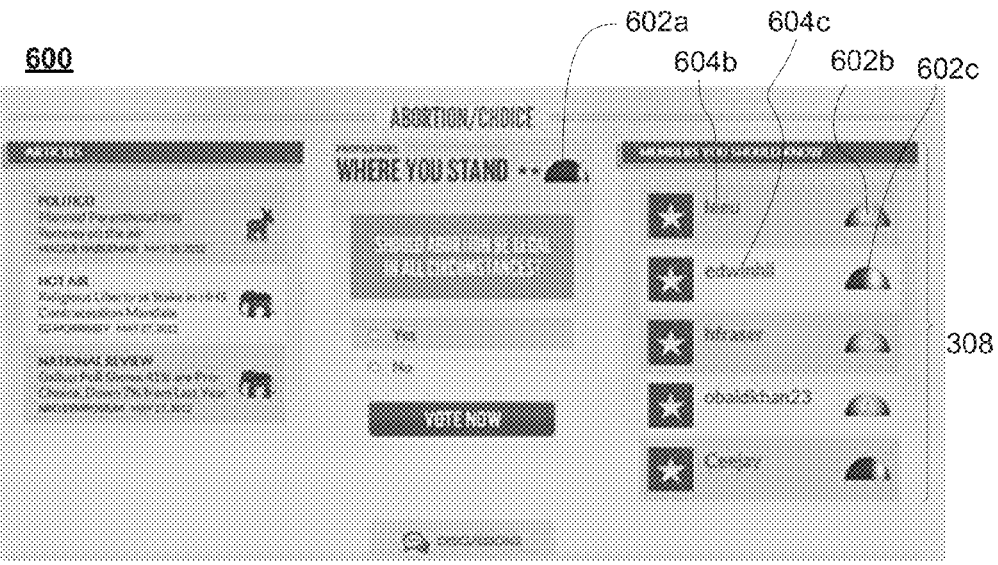
FIGS. 6-7 are screenshots of exemplary graphical user interfaces for presenting information about other users which have been recommended to the user, according to the present disclosure.
Figure 7:
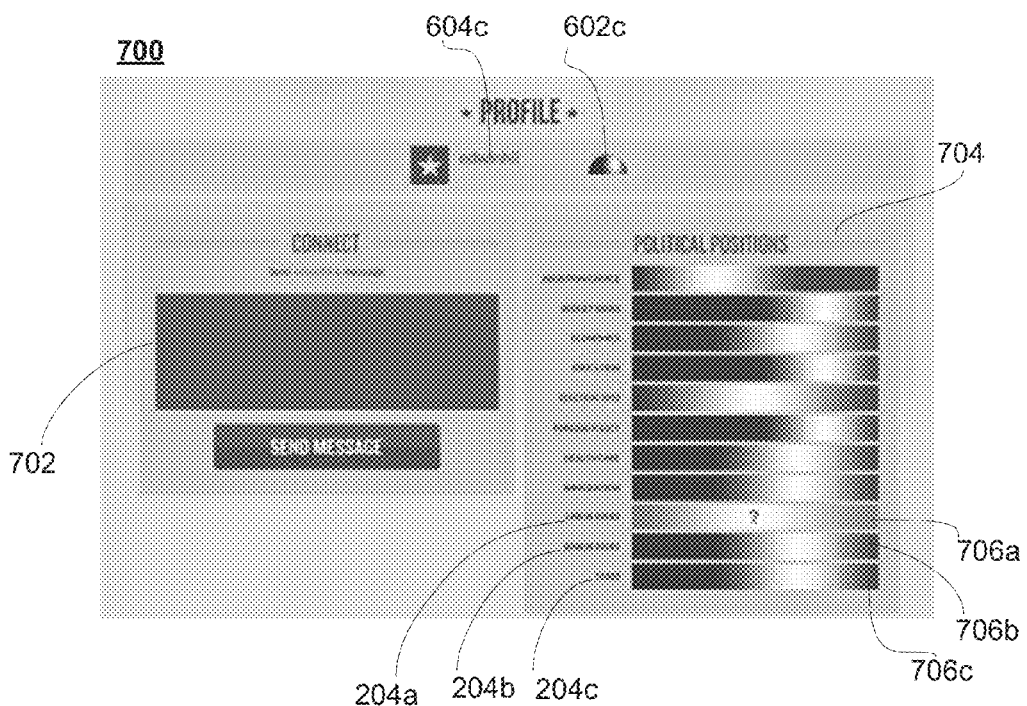

Referring now to FIGS. 6-7, screenshots 600 and 700 which illustrate exemplary graphical user interfaces for presenting information about other users 102 which have been recommended to a given user 102, according to an aspect of the present disclosure, are shown.

Information about users 102, including received opinions, received answer choices 208, information received from third parties, and directly received user information (e.g., demographic information and political party affiliation) may be stored in database 122. In some aspects, a multi-dimensional profile is created using such information for a given user 102. In some aspects, received information stored in the multi-dimensional user profile comprises information about the user's interest levels in poll topics 204, such as economics, federal government budget issues, crime, and immigration. The multi-dimensional profile may comprise information about the user's interest levels in non-political poll topics 204, such as arts, entertainment, recreation, vacation preferences, and the like.

In some aspects, personnel from the application service provider that make infrastructure 101 available to users 102 may create a poll 202 related to one or more poll topics 204. Such personnel would assign one or more values to answer choices 208 which correspond to user interest and position for poll topic 204. For example, a poll 202 comprising answer choices 208*a-d* may be created. Poll 202 may be related to a poll topic 204 such as "Education." Answer choice 208*a* may be a selection indicating high user interest in poll topic 208 and considered a "liberal" position. Answer choice 208*b* may be a selection indicating medium user interest in poll topic 204 and considered a "liberal" position. Answer choice 208*c* may be a selection indicating low user interest in poll topic 204 and considered a "conservative" position. Answer choice 208*d* may be a selection indicating high user interest in poll topic 204 and considered a "conservative" position. In some aspects, user 102 chooses answer choice 208*a-d* and the interest level and position values assigned to the answer choice 208 are stored in the user's multi-dimensional profile. In some aspects, the multi-dimensional profile contains some or all of the values associated with answer choices 208 selected by the user.

Information contained in the multi-dimensional user profile may be analyzed and presented in a profile summary 602 (shown, for clarity, only as profile summaries 602*a-c* in FIG. 6), each being associated with a particular user 102. Profile summary 602 is a visual representation of an analysis of received user information. Each profile summary 602 facilitates identification of other users 102 with similar characteristics to a given user under consideration. In some aspects, profile summary 602 is a graphical representation. For example, profile summaries 602 contained in screenshot 600 are icons comprising varying amounts of red and blue. The amount of red contained in a profile summary 602 indicates the number and degree of conservative positions adopted by user 102 associated with profile summary 602, compared to the number and degree of liberal positions adopted as indicated by the amount of blue displayed.

Profile summary 602*a* indicates a high number of liberal positions relative to conservative positions. Other user 102 recommendations for a specific user 102 are presented in member list 308. In some aspects, member list 308 comprises one or more usernames 604 (shown, for clarity, only as usernames 604*b-c* in FIG. 6) and one or more corresponding profile summaries 602. Profile summary 602*c* for username 604*c* "edwinhill" indicates slightly more conservative positions than the specific user 102 interacting with screenshot 600 as indicated by profile summary 602*a*. Profile summary 602*b* contains a question mark indicating insufficient information has been received about user 102 with username 604*b* "leeu" to create a profile summary 602. In other aspects, profile summary 602 is simply a text label (e.g., "evangelical conservative," "neo conservative," "moderate," "liberal," "very liberal," etc.).

In some aspects, username 604 is selectable by user 102. Selection of username 604 presents user 102 with additional information about user 102 represented by username 604. For example, as shown in FIG. 7, selection of username 604*b* presents user 102 with a detailed information page about user 102 with username 604*b* "edwinhill."

In one aspect, the detailed information presented about another user 102 includes username 604, profile summary 602, and position detail list 704 comprising one or more poll topic positions 706 (shown as poll topic positions 706a-c in FIG. 7) related to one or more poll topics 204 (shown as poll topics 204a-c in FIG. 7). Poll topic position 706 is a visual representation of information related to the corresponding poll topic 204 which is contained in the presented multi-dimensional profile.

In an aspect, information contained in a multi-dimensional profile is analyzed in order to generate a visual representation of a user's position for poll topic 204. In some aspects, poll topic position 706 is a visual representation indicating a user's political position (i.e., how "liberal" or "conservative" is user 102) about poll topic 204. In other aspects, poll topic position 706 is a visual representation indicating more than one value associated with poll topic 204.

In addition to presenting detailed information about another user 102, aspects in accordance with screenshot 700 may also present a messaging client 702. Messaging client 702 is an internal (system 100) messaging service configured to allow users 102 to send messages to one another. In some aspects, messaging client 702 is configured to allow text-based messages to be sent. In another aspect, messaging client 702 is configured to allow inclusion of hyperlinks, images, audiovisual clips, and other multimedia files within the message.

In some aspects, information presented to user 102 includes a position detail list 704. Position detail list 704 is a visual representation of received information about the user 102. For example, in FIG. 7, user position list 704 corresponds with user 102 with username 604b "edwinhill" and comprises poll topic position 706a corresponding with user 102 information related to poll topic 204a "Labor Issues." Poll topic position 706a represents a lack of information in the user's multi-dimensional profile with respect to poll topic 204a because insufficient information has been received. The multi-dimensional profile corresponding with username 604b contains sufficient information to present poll topic position 706b and poll topic position 706c related to poll topic 204b "Senior Issues" and poll topic 204c "Taxes." Poll topic position 706b and poll topic position 706c are visual representations of sliding scales which indicate that this user is more "liberal" on poll topic 204b and poll topic 204c.

Figure 8:
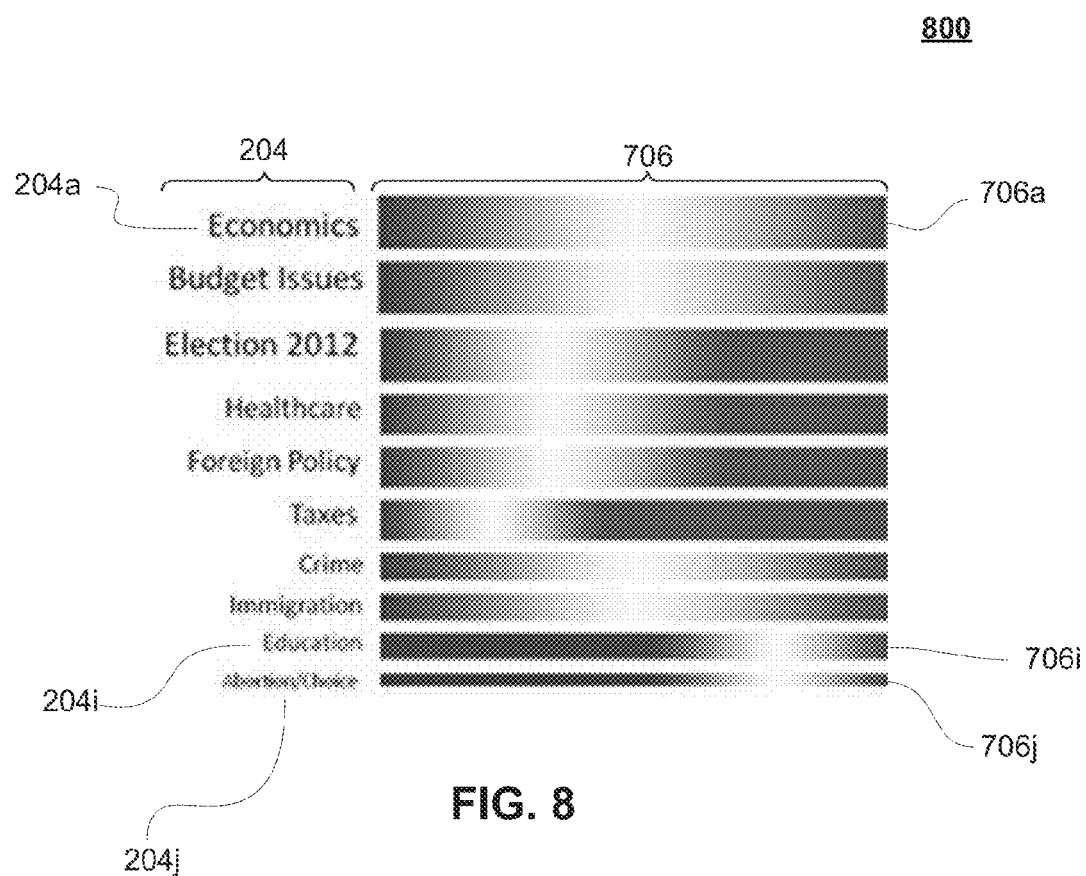
FIG. 8 is a screenshot of an exemplary graphical user interface for presenting information about user opinions on selected topics, according to the present disclosure.

Referring now to FIG. 8, screenshot 800 of an exemplary graphical user interface for presenting a user 102 with information contained in a multi-dimensional profile related to selected poll topics 204, according to the present disclosure, is shown.

In an aspect, poll topic positions 706 (shown, for clarity, only as poll topic positions 706a, 706i, and 706j in FIG. 8) are visual representations indicating one or more values associated with poll topic 204. In some aspects, poll topic position 706 is configured to visually represent user's 102 political position (i.e., how "liberal" or "conservative" is user 102) via the colors displayed in poll topic position 706 and is configured to display user interest in poll topic 204 via the height of poll topic 204 and poll topic position 706.

In the aspect depicted in FIG. 8, poll topic position 706 is configured to visually represent a user's political position (i.e., how "liberal" or "conservative" user 102 is) via the location of a slider between the left-end portion and the right-end portion of poll topic position 706. Here, a user's "liberal" position on a corresponding poll topic 204 is indicated via placement of the slider (depicted as a white bar in FIG. 8) closer to the left-end portion of poll topic position 706 (exemplified by poll topic position 706a). A user's "conservative" position on a corresponding poll topic 204 is indicated via placement of the slider closer to the right-end portion of poll topic position 706 (exemplified by poll topic position 706i and poll topic position 706j in FIG. 8).

Poll topic position 706 is also configured to display user interest in poll topic 204 via the height of poll topic 204 and poll topic position 706. For example, poll topic 204j and corresponding poll topic position 706j represent low user interest value in poll topic 204j via a relatively small height. Poll topic 204i and corresponding poll topic position 706i, however, indicate a medium user interest value in poll topic 204i. Poll topic 204a and corresponding poll topic position 706a are very large compared to other poll topics 204 and poll topic positions 706 presented in screenshot 800, indicating a high user interest value in poll topic 204a.

Figure 9:
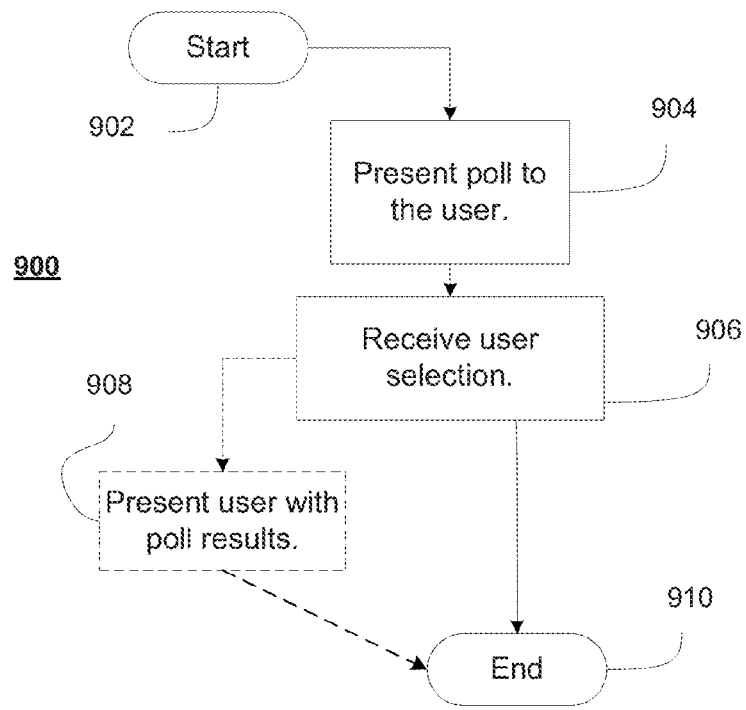
FIG. 9 is a flowchart illustrating an exemplary process for receiving user opinions, according to the present disclosure.

Referring now to FIG. 9, a flowchart illustrating an exemplary process 900 for receiving user 102 answer choice 208 selections, according to an aspect of the present disclosure, is shown. Process 900, which may execute within system 100, begins at step 902 with control passing immediately to step 904.

In step 904, user 102 is presented with a poll 202 (e.g., as shown in screenshots 200 or 400). Poll 202 is presented to user 102 such that user 102 may select one or more answer choices 208 indicating their opinion of prompt 206. The user's selection is received in step 906. In some aspects, each received user selection of answer choice 208 is stored in a multi-dimensional profile for such user 102. In some aspects, media recommendations 306 and member listing 308 are updated upon each iteration of step 906.

Optionally, in step 908, user 102 is presented with poll result 302 corresponding to poll 202 user 102 participated in during step 906. In some aspects, poll result 302 is presented to user 102 as shown in screenshot 300. Upon completion of step 908, process 900 ends as indicated by step 910.

In alternate aspects, process 900 is repeatable such that user 102 is presented with a plurality of polls 202 in succession and the user's selection of answer choices 208 corresponding with each of the polls 202 are recorded in the user's multi-dimensional profile. In an aspect, polls 202 presented in succession to user 102 are dependent on the user's previous selections of answer choices 208. For example, subsequent polls 202 presented to user 102 are chosen to identify their opinion of poll topic 204 "Education" in response to an initial received user selection related to poll topic 204 "Education."

Figure 10:
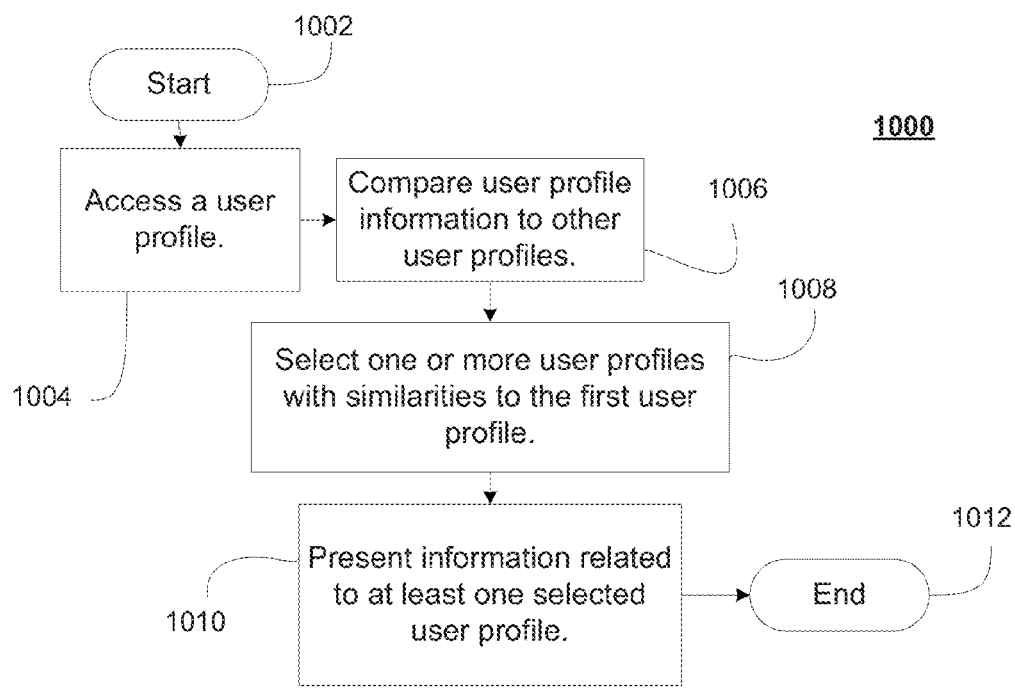
FIG. 10 is a flowchart illustrating an exemplary process for presenting information about other users, in accordance with the present disclosure.

Referring now to FIG. 10, a flowchart illustrating process 1000 for presenting a specific user 102 with information about other users 102, according to an aspect of the present invention, is shown. In such an aspect, process 1000 facilitates the suggestion of other users 102 with whom the specific user 102 may enjoy interacting with. Process 1000 which may execute within system 100, begins at step 1002 with control passing immediately to step 1004.

In step 1004, a user's multi-dimensional profile is accessed. That is, at least one piece of received information (or trait) contained in the multi-dimensional profile is accessed. Accessed information may include, but is not limited to, a received answer choice 208 selection, a political position value on a given poll topic 204, an interest level value on a given poll topic 204, and/or any demographic information.

Upon accessing such information in step 1004, step 1006 is executed. In step 1006, information accessed from the user's multi-dimensional profile is compared to information in other user 102 multi-dimensional profiles. In one aspect, process 1000 generates an output for a specific user suggesting other users 102 with whom the specific user may enjoy interacting.

The user 102 being presented with information is denoted as "user K" and each one of the other users 102 with whom they may enjoy interacting is denoted as "user L." Thus, comparison of "user K" and "user L" is based at least in part on evaluation of vector distance between individual profiles according to the following equation:

$$D_{K-L} = \sqrt{(\Sigma_I(W(I,K)*(P(I,L)-P(I,K))^2))};$$

where:
$D_{K-L}$ is the vector distance of the profile of user K from that of user L (user K's impression of how similar user L is in terms of ideology)
W(I,K) is the factor that represents interest level information of user K for topic I
P(I,L) is the political position value of user K on a poll topic I; and
P(I,K) is the political position value of user L on poll topic I.

In such an aspect, vector distance is directional. That is: $D_{K-L} \ne D_{L-K}$.

Vector directionality results from the manner of calculating interest levels in this aspect. The computation of $D_{K-L}$ uses interest level weights W(I,K), while the computation for $D_{L-K}$ uses interest level weights W(I,L). The selection of users 102 from a group G of users 102, paired with a user K will be based on an analytical ordering of distances $D_{K-X}|X\epsilon G$.

Upon completion of step 1006, step 1008 is initiated where information about one or more users 102 with similar multi-dimensional profiles is selected. In some aspects, users 102 are selected with only similar interest levels and opinions for a given poll topic 204. In other aspects, users 102 are selected where the calculated $D_{K-L}$ is low. The directional computation of vector distances in some aspects of step 1006 identifies where similarities exist on political positions and where interest values match. Process 1000 also identifies where interest values match but political positions are very different. In some aspects, users 102 are presented where the calculated $D_{K-L}$ is high, due to interest level value similarity but political position difference. This type of matching ensures that recommendations are directed at users 102 more likely to initiate an issue-based interaction.

Upon completion of step 1008, process 1000 proceeds to step 1010. In step 1010, information related to one or more users 102 (i.e., "users L") identified in step 1008 is presented via, for example, computing device 104. In some aspects, similar users 102 are presented as shown in screenshot 300. In other aspects, similar users 102 are presented as shown in screenshot 600. In another aspect, information about selected users 102 is simply stored and not presented to user K, creating a grouping of users 102 who may respond consistently and positively to certain types of advertising messaging, engagement communication messaging, coupons, advocacy messaging, and the like.

Upon completion of step 1010, process 1000 ends as indicated by step 1012.

Figure 11:
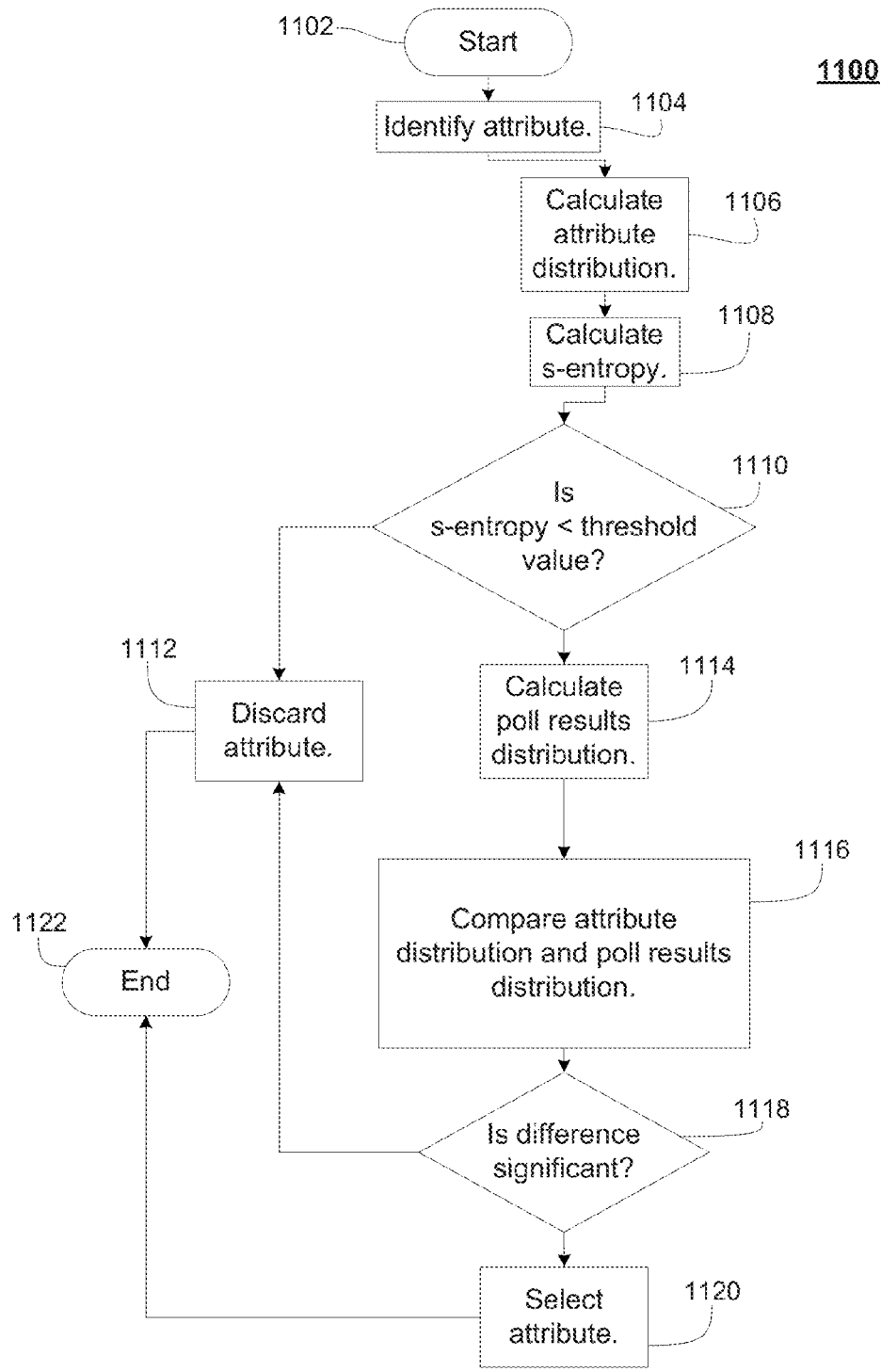
FIG. 11 is a flowchart illustrating an exemplary process for identifying relationships between user profile attributes and population attributes, according to the present disclosure.

Referring now to FIG. 11, a flowchart illustrating an exemplary process 1100 for identifying relationships between user 102 information and received user opinions, according to the present disclosure, is shown.

For the purposes of process 1100, information related to an area of interest is called an "attribute." Areas of interest may include, but are not limited to, political party affiliation, gender, age, race, answer choice 208 selection, interest in a given poll topic 204, answer choice 208 given, and political position values. Areas of interest may also include buying habits, brand loyalty, home location, philosophies on raising children, and the like.

For the purposes of this disclosure, "attribute set" or "set of attributes" and/or the plural form of these terms are used interchangeably to refer to one or more data sets comprising information from a plurality of users 102 relating to a common attribute subject. For example, an attribute set may comprise the ages of all users 102 utilizing infrastructure 101. Similarly, an attribute set may comprise soft drink purchasing habit information for users 102 utilizing infrastructure 101 between the ages of 18 and 25.

Process 1100 facilitates identification of attributes which correlate with received user opinions, the frequency distribution of an answer choice 208 within a result 302, user buying habits, or other information collected about users 102, regardless of origin (collectively, "poll results"). For example, process 1100 facilitates determining if users 102 with the attribute of being associated with the Democratic Party correlate with selection of a pro-choice abortion answer choice 208.

In another aspect, process 1100 facilitates determining if users 102 with the attribute of being between the ages of 18 and 34 correlate with the selection of an answer choice 208 indicating interest in buying a new convertible automobile.

In yet another aspect, process 1100 facilitates determining if users 102 with the attributes of being female, living in the Midwest, and college educated correlate with the selection of an answer choice 208 indicating interest in switching the brand of razor they use.

Process 1100 which may execute within system 100, begins at step 1102 with control passing immediately to step 1104.

In step 1104, one or more attributes are identified to compare with poll results. In an aspect, the identified attribute(s) are chosen for comparison to poll results from a given poll 202.

In another aspect, the identified attribute(s) are chosen for comparison to poll results received from third parties, such as online purchasing habits. For example, the attribute may be "owning three or more vehicles" (V) which has been chosen to compare to how much, if any, garage organization products such users 102 purchase online. Similarly, the attribute may be "owning three or more vehicles" (V) which has been chosen to compare to how many, if any, pets users 102 own. Note, as shown in the previous example, the attribute chosen may be compared poll results which initially appear to have no direct relationship with the attribute.

One or more attributes may be identified such that process 1100 is executed multiple times to compare the identified attributes. In one aspect, attributes age (A), gender (G), and environmental leaning (E) are identified. Identification may be done by a user 102, application service provider personnel, or another means, depending on aspect. In other aspects, identified attributes are combinations of two or more other attributes. For example, combinations of age and gender (AG), age and environment (AE), environment and gender (EG), and age, gender and environment (AGE) may be considered for use in process 1100.

In step 1106, the distribution of the attribute identified in step 1104 is calculated. The calculation may be done by any method known to those skilled in the relevant art(s), including calculating the frequency distribution of the attribute. For example, calculation of the distribution of political party affiliation for a group of users 102 may reveal a 50% Democratic Party affiliation and a 50% Republican Party affiliation.

In step 1108, the uncertainty of the attribute identified in step 1104 is calculated. In one aspect, uncertainty is determined via a dispersion analysis. The dispersion may be calculated via determining the Shannon Entropy (or "s-entropy"; see Claude E. Shannon & Warren Weaver, *The Mathematical Theory of Communication*, Univ. of Illinois Press, 1949, ISBN 0-252-72548-4, incorporated herein by reference) of the distribution calculated in step 1106. For attribute X with N users 102 distributed among three attribute choices p, q, and r as $N_p$, $N_q$, and $N_r$, the s-entropy is measured as:

$$S_X = 1 - (N_p^2 + N_q^2 + N_r^2)/N^2$$

In an aspect, the attribute choice is a possible response in a poll result, such as an income level, political affiliation, interest level, and the like.

In other aspects, uncertainty may be determined using methods apparent to those skilled in the relevant art(s) after reading the description herein.

In step 1110, uncertainty values, such as S values, calculated in step 1108 are compared to a pre-defined or pre-set threshold value. In an aspect, attributes with an S value below a pre-defined threshold are chosen as indicative attributes for correlation with poll results and process 1100 proceeds to step 1114. Where an S value for an attribute is greater than a pre-defined threshold, process 1100 proceeds to step 1112, where the attribute is discarded. After an attribute is discarded in step 1112, process 1100 ends as indicated by step 1122.

Where process 1100 proceeds to step 1114 with an attribute with S value below a pre-defined threshold, the distribution of poll results being examined is calculated. The calculation may be done by any method known to those skilled in the relevant art(s), including calculating the frequency distribution of poll results.

In step 1116, the attribute distribution and the poll results distribution are compared. In an aspect, the difference between the mean value of the attribute distribution and the poll results distribution is calculated. If the mean calculated in step 1116 is greater than a pre-determined value, determining step 1118 is negative and the attribute is discarded. If the mean value calculated in step 1116 is not significant, determining step 1118 is positive, the attribute is indicative of the information the attribute was compared to (e.g., users 102 who own a Prius® vehicle (available from Toyota Motor Corporation of Japan) are more likely to self-identify as Democratic), and process 1100 proceeds to step 1120.

In an alternative aspect, the attribute distribution and the poll results distribution are compared via application of genetic algorithms (see S. N. Sivanandam, et. Al., *Introduction to Genetic Algorithms*, Springer, 2007, ISBN 354073189X, incorporated herein by reference). If the difference between the attribute distribution and poll results distribution is more significant than a pre-defined value, step 1118 executes as previously described step 1112—wherein the attribute is discarded. If the difference between the attribute distribution and poll results distribution is not significant, process 1100 proceeds to step 1120.

In step 1120, the attribute is selected. Selection indicates that the attribute identified in step 1104 correlates to the behavior of poll results. Selection of the attribute in this manner provides an attribute which may be utilized to predict user 102, individual, or group behaviors regarding related poll results. Upon completion of step 1120, process 1100 terminates as indicated by step 1122.

In an aspect, process 1100 may be utilized to identify whether other individuals will behave in a specific manner, based on their attributes. For example, process 1100 may indicate that individuals with the attribute of having a residence on a body of water (e.g., a riverfront home) are likely to, according to poll results, give 12% or more of their income to charity. Such information is useful to a charity, for example, because the charity may use it to target mass mailing campaigns.

Similarly, process 1100 may indicate that individuals with the attribute of regularly purchasing automobiles from domestic manufacturers are likely to, according to poll results, vacation in Mexico. Such information may be useful to domestic automobile manufacturers because they can place advertisements in vacation destinations within Mexico, thereby reaching other individuals with similar preferences and tastes.

Process 1100 may be repeated over time in order to determine if selected attributes continue to be associated with given poll results. In this manner, process 1100 may be utilized to facilitate individual, group, and/or audience response to messaging, advertising, external factors, and other changes, such as current events.

Figure 12:
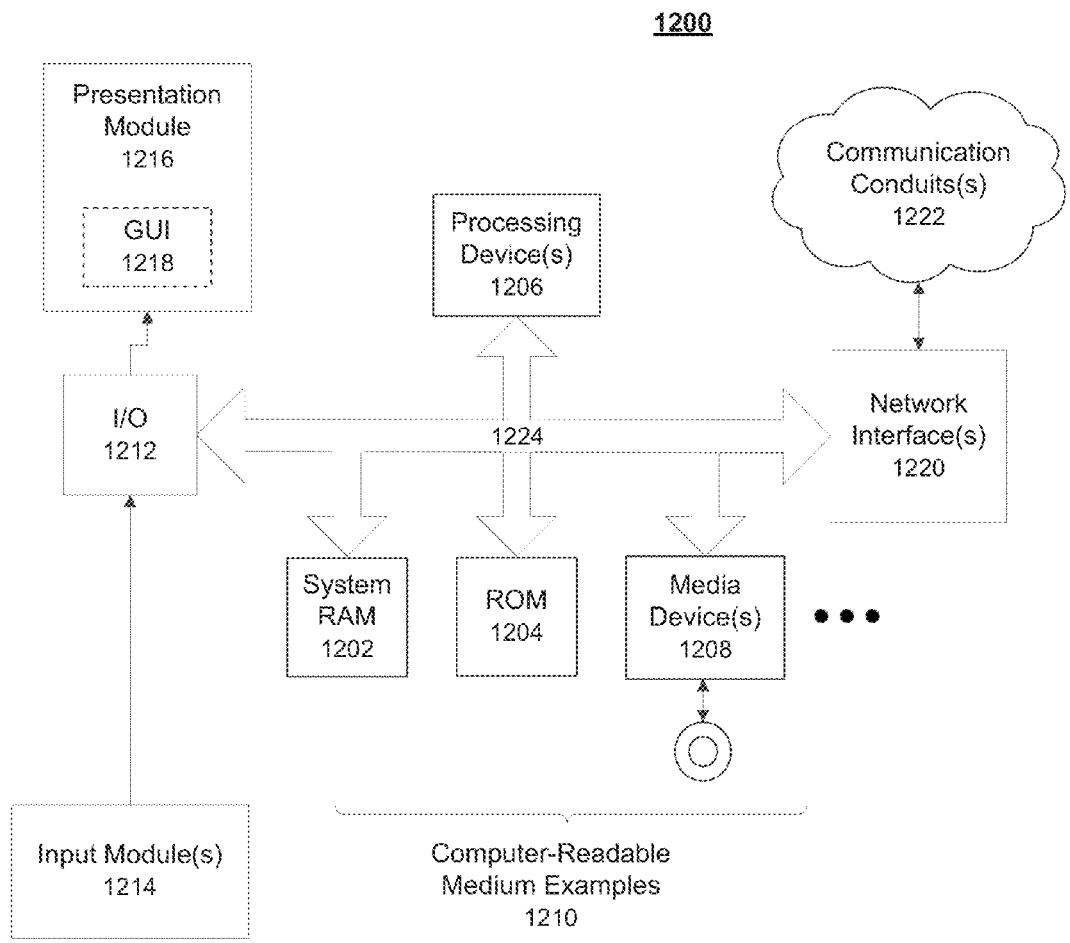
FIG. 12 is a block diagram illustrating an exemplary computer system useful for implementing the present disclosure.
Figure 12:

Referring now to FIG. 12, a block diagram illustrating an exemplary computer system useful for implementing the present disclosure is shown. That is FIG. 12 sets forth illustrative computing functionality 1200 that may be used to implement any component of the systems (e.g., system 100) or any aspects of the functions (e.g., processes 900-1100) described herein. In all cases, computing functionality 1200 represents one or more physical and tangible processing mechanisms.

Computing functionality 1200 may include volatile and non-volatile memory, such as RAM 1202 and ROM 1204, as well as one or more processing devices 1206 (e.g., one or more central processing units (CPUs), one or more graphical processing units (GPUs), and the like). Computing functionality 1200 also optionally includes various media devices 1208, such as a hard disk module, an optical disk module, and so forth. Computing functionality 1200 can perform various operations identified above when the processing device(s) 1206 executes instructions that are maintained by memory (e.g., RAM 1202, ROM 1204).

More generally, instructions and other information may be stored on any computer readable medium 1210, including, but not limited to, static memory storage devices, magnetic storage devices, and optical storage devices. The term "computer readable medium" also encompasses plural storage devices. In all cases, computer readable medium 1210 represents some form of physical and tangible entity. By way of example, and not limitation, computer readable medium 1210 may comprise "computer storage media" and "communications media."

"Computer storage media" include volatile and non-volatile, removable and non-removable media implemented in any method or technology for storage of information, such as computer readable instructions, data structures, program modules or other data. Computer storage media include, but are not limited to, RAM 1202, ROM 1204, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable medium.

Computing functionality 1200 also includes an input/output module 1212 for receiving various inputs (via input modules 1214), and for providing various outputs (via one or more output modules). One particular output mechanism may include a presentation module 1216 and an associated GUI 1218. Computing functionality 1200 may also include one or more network interfaces 1220 for exchanging data with other devices via one or more communication conduits 1222. One or more communication buses 1224 communicatively couple the above-described components together.

Communication conduit(s) 1222 may be implemented in any manner (e.g., by a local area network, a wide area network (e.g., the Internet), etc., or any combination thereof). Communication conduit(s) 1222 can include any combination of hardwired links, wireless links, routers, gateway functionality, name servers, etc., governed by any protocol or combination of protocols.

Alternatively, or in addition, any of the functions described herein can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code can be stored in one or more computer readable memory devices, as described with reference to FIG. 12 The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

In some aspects, computing functionality 1200 implements processes and methods described herein. In other aspects, presentation module presents screenshots, visual representations, and GUIs to the user as described herein.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents. For example, exemplary aspects disclose the operation of systems, methods, and computer program products in the context of a gathering information and linking users 102 based on information about political preferences, however these examples are not presented as a limitation. Systems, methods, and computer program products in accordance with the present disclosure may, for example, be utilized to gather information about individuals, and groups and analyze such information in order to make connections between a variety of topics, products, and services.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A computer-implemented method for facilitating identification of correlations in user data, the method comprising the steps of:
    receiving, by a polling infrastructure having a server, user opinions from a plurality of users, the user opinions relating to a topic wherein a user opinion of a respective user being from a user account associated with the respective user on a third party network platform and the polling infrastructure is different from the third party network platform;
    receiving, by the polling infrastructure, a plurality of attribute sets, each of the plurality of attribute sets comprising user information from a plurality of users related to one of a plurality of attribute subjects;
    selecting, by the polling infrastructure, a subset comprising at least one of the plurality of attribute sets;
    creating, by the polling infrastructure, at least one grouping, each grouping comprising user information associated with each of the at least one of the plurality of attribute sets comprising the subset and the at least one grouping includes the respective user;
    creating, by the polling infrastructure, a user opinion distribution of the user opinions associated with the at least one grouping;
    calculating, by the polling infrastructure, the user opinion uncertainty of the user opinion distribution;
    determining, by the polling infrastructure, if the user opinion uncertainty is less than a user opinion threshold value;
    identifying, by the polling infrastructure, if determining step is positive, the at least one grouping as correlating with user opinions for the topic; and
    generating, by the polling infrastructure, peer-to-peer connections to members in the at least one grouping on a graphical user interface displayed by the respective user through the polling infrastructure, wherein the members being associated with the polling infrastructure.

2. The method of claim 1, further comprising the steps of:
    calculating a user opinion distribution mean;
    creating an at least one grouping distribution;
    calculating an at least one grouping distribution mean;
    comparing the user opinion distribution mean and the at least one grouping distribution mean; and where wherein the comparison of the user opinion distribution mean and the at least one grouping distribution mean is statistically significant, discarding the at least one grouping.

3. The method of claim 1, wherein the user opinions are received from the plurality of users via at least one poll presented via a plurality of computing devices.

4. The method of claim 3, wherein the plurality of users are presented with a plurality of polls over time.

5. The method of claim 1, further comprising the step of: presenting targeted information to a group member; wherein the group member has attributes associated with the identified at least one grouping.

6. The method of claim 5, wherein the targeted information is chosen based on the user opinions associated with the identified at least one grouping.

7. The method of claim 5, wherein the targeted information is one of:
an advertisement;
a coupon;
a customer engagement message;
an advocacy message; and
a political message.

8. A system for facilitating identification of correlations in user data, comprising:
a polling infrastructure comprising: at least one web server; a graphical user interface (GUI) communicated via a communications network to a plurality of computing devices, the plurality of computing devices configured to communicate with a plurality of users; a user database comprising user opinions received from a plurality of users, the user opinions relating to a topic wherein a user opinion of a respective user being from a user account associated with the respective user on a third party network platform and the polling infrastructure is different from the third party network platform; and an attribute set database comprising a plurality of attribute sets, each of the plurality of attribute sets comprising user information from a plurality of users related to one of a plurality of attribute subjects;
the polling infrastructure to:
select a subset comprising at least one of the plurality of attribute sets;
create at least one grouping, each grouping comprising user information associated with each of the at least one of the plurality of attribute sets comprising the subset;
create a user opinion distribution of the user opinions associated with the at least one grouping;
calculate a user opinion uncertainty of the user opinion distribution and determine if the user opinion uncertainty is less than a user opinion threshold value;
provide a correlation database to store the at least one grouping when the user opinion uncertainty is less than the user opinion threshold value; and
generate peer-to-peer connections to members in the at least one grouping on the graphical user interface displayed by the respective user through the polling infrastructure, wherein said members being associated with the polling infrastructure,
wherein the at least one grouping stored in the correlation database correlates with user opinions for the topic.

9. The system of claim 8, wherein the polling infrastructure further to:
calculate a user opinion distribution mean, calculate an at least one grouping distribution, and compare the user opinion distribution mean and the at least one grouping distribution mean;
wherein, if the comparison of the user opinion distribution mean and the at least one grouping distribution mean is statistically significant, the at least one grouping is not stored in the correlation database.

10. The system of claim 8, wherein the user database is further configured to receive user opinions provided via a plurality of computing devices.

11. The system of claim 10, further comprising:
at least one poll server, communicatively coupled to the at least one web server, to present the plurality of users with a plurality of polls over time.

12. The system of claim 8, further comprising:
at least one presentation server, communicatively coupled to the at least one web server, to present targeted information to a group member via the plurality of computing devices;
wherein the group member has attributes associated with the identified at least one grouping.

13. The system of claim 12, wherein the targeted information is chosen based on the user opinions associated with the identified at least one grouping.

14. One or more non-transitory, tangible computer storage media having stored thereon multiple instructions that facilitate identification of correlations in user data by, when executed by one or more processors of a computing device, causing the one or more processors to:
receive, by a server of a polling infrastructure communicating over a network, user opinions from a plurality of users, a user opinion of a respective user being from a user account on a third party network platform associated with the respective user, the user opinions relating to a topic, the polling infrastructure is different from the third party network platform;
receive, by the polling infrastructure, a plurality of attribute sets, each of the plurality of attribute sets comprising user information from a plurality of users related to one of a plurality of attribute subjects;
select, by the polling infrastructure, a subset comprising at least one of the plurality of attribute sets;
create, by the polling infrastructure, at least one grouping, each grouping comprising user information associated with each of the at least one of the plurality of attribute sets comprising the subset;
create, by the polling infrastructure, a user opinion distribution of the user opinions associated with the at least one grouping;
calculate, by the polling infrastructure, the user opinion uncertainty of the user opinion distribution;
determine, by the polling infrastructure, if the user opinion uncertainty is less than a user opinion threshold value;
identify, by the polling infrastructure, where the user opinion uncertainty is less than the user opinion threshold value, the at least one grouping as correlating with user opinions for the topic; and
generating, by the polling infrastructure, peer-to-peer connections for members in the at least one grouping to the respective user on a graphical user interface, wherein the members being associated with the polling infrastructure.

15. The one or more non-transitory, tangible computer storage media as recited in claim 14, wherein the multiple instructions further cause one or more processors to:

calculate, by the polling infrastructure, a user opinion distribution mean;

create, by the polling infrastructure, an at least one grouping distribution;

calculate, by the polling infrastructure, an at least one grouping distribution mean;

compare, by the polling infrastructure, the user opinion distribution mean and the at least one grouping distribution mean; and wherein the comparison of the user opinion distribution mean and the at least one grouping distribution mean is statistically significant, discard the at least one grouping.

16. The one or more non-transitory, tangible computer storage media as recited in claim 14, wherein the user opinions are received from the plurality of users via at least one poll presented via a plurality of computing devices.

17. The one or more non-transitory, tangible computer storage media as recited in claim 14, wherein the multiple instructions further cause one or more processors to:
present targeted information to a group member;
wherein the group member has attributes associated with the identified at least one grouping.

18. A computer-implemented method for facilitating peer-to-peer connections based on correlations of user data, the method comprising the steps of:
polling, by a polling infrastructure having a server, on a third party network to receive user opinions;
creating, by the polling infrastructure, a first multi-dimensional user profile comprising:
user K opinions received from a user K, relating to a topic; and
user K information received from the user K, relating to at least one attribute subject wherein the user K opinions being from user K account on the third party network associated with the user K wherein the polling infrastructure is different from the third party network;
creating, by the polling infrastructure, a second multi-dimensional user profile for each member of a group of members, each second multi-dimensional user profile comprising:
member opinions received from a member, relating to the topic; and
member information received from the member, relating to the at least one attribute subject;
comparing, by a polling infrastructure, the first multi-dimensional user profile and the second multi-dimensional user profile for said each member of the group of members;
presenting, by a polling infrastructure, a display on a graphical user interface the second multi-dimensional user profiles wherein the comparison of the first multi-dimensional user profile and the each second multi-dimensional user profile yields similarities in one of:
interest level in the topic; and
user K opinion and a member opinion; and
generating, by the polling infrastructure, peer-to-peer connections for each member in the group of members to the user K on a graphical user interface displayed by the polling infrastructure while the user K interacts with the polling infrastructure, wherein said each member being associated with the polling infrastructure.

19. The method of claim 18, further comprising the step of:
presenting, by a polling infrastructure, a user K summary, the user K summary comprising at least one graphical representation of user K opinions.

20. The method of claim 18, further comprising the step of:
facilitating, by a polling infrastructure, communication between the user K and a respective one member through a corresponding peer-to-peer connection displayed on the graphical user interface.

21. A system for facilitating peer-to-peer connections based on correlations of user data, comprising:
at least one web server of polling infrastructure to provide a graphical user interface, via a communications network, to a plurality of computing devices, the polling infrastructure to conduct polling through a third party network;
a user database comprising user opinions received from a plurality of users, the user opinions relating to a topic;
at least one profile server, communicatively coupled to the at least one web server, the at least one profile server comprising:
a profile database configured to store a first multi-dimensional user profile and at least one second multi-dimensional user profile for at least one member;
wherein the first multi-dimensional user profile comprising: a user K opinions received from a user K, relating to a topic; and user K information received from the user K, relating to at least one attribute subject wherein the user K opinions being from user K account on the third party network associated with the user K wherein the polling infrastructure is different from the third party network; and
each second multi-dimensional user profile being for each respective member of a group of members, comprising:
member opinions received from the respective member, relating to the topic; and
member information received from the respective member, relating to the at least one attribute subject; and
at least one profile presentation server, communicatively coupled to the at least one web server, to present said each second multi-dimensional user profile to the user K based on a comparison of the first multi-dimensional user profile and said each second multi-dimensional user profile which yields a similarity; and
wherein the graphical user interface to present peer-to-peer connections for each member in the group of members to the user K, where said each member being associated with the polling infrastructure.

22. The system of claim 21, wherein the at least one profile presentation server to further present a user summary to the each member of the group of members, the user summary comprising at least one graphical representation of the member opinions and similarities in one of:
interest level in the topic; and
the member opinion and the user K opinion.

23. The system of claim 21, further comprising:
at least one user communication server, communicatively coupled to the at least one web server, the at least one communication server capable of facilitating communication between the user K and the group of members.

24. The one or more non-transitory, tangible computer storage media having stored thereon multiple instructions that facilitate peer-to-peer connections based on correlations of user data by, when executed by one or more processors of a computing device, causing the one or more processors to:
poll, by a polling infrastructure, on a third party network to receive user opinions;
create, by the polling infrastructure, a first multi-dimensional user profile comprising:

(i) user K opinions received from a user K, relating to a topic; and
(ii) user K information received from the user K, relating to at least one attribute subject wherein the user K opinions being from user K account on the third party network associated with the user K wherein the polling infrastructure is different from the third party network;

create a second multi-dimensional user profile comprising:
(i) user L opinions received from a user L, relating to the topic; and
(ii) user L information received from the user L, relating to the at least one attribute subject;

compare the first multi-dimensional user profile and the second multi-dimensional user profile;

present the second multi-dimensional user profile to the user K where the comparison of the first multi-dimensional user profile and the second multi-dimensional user profile yields similarities in one of:
interest level in the topic; and
user K opinion and user L opinion, and generate, by the polling infrastructure, a peer-to-peer connection between the user K and the user L on a graphical user interface displayed to the user K while the user K interacts with the polling infrastructure.

25. The one or more non-transitory, tangible computer storage media as recited in claim 24, wherein the multiple instructions further cause one or more processors to:
(e) present, by the polling infrastructure, a user K summary to the user L, the user K summary comprising at least one graphical representation of user K opinions and similarities in one of:
interest level in the topic; and
user K opinion and user L opinion.

26. The one or more non-transitory, tangible computer storage media as recited in claim 24, wherein the multiple instructions further cause one or more processors to:
facilitate communication between the user K and the user L.

* * * * *